March 31, 1931.    S. WEISS    1,798,441
SINK CATCH TRAP
Filed Jan. 16, 1929
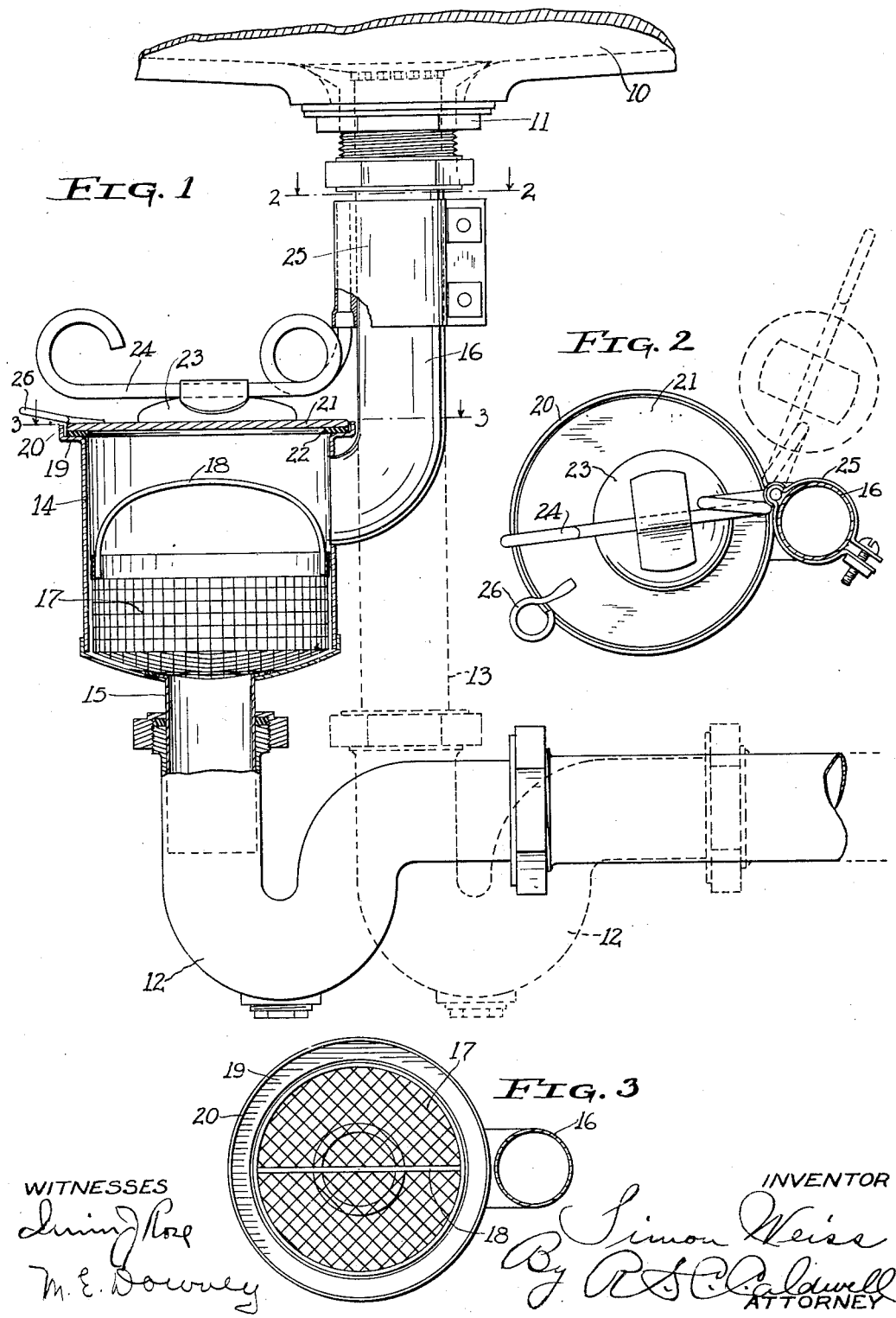

Patented Mar. 31, 1931

1,798,441

UNITED STATES PATENT OFFICE

SIMON WEISS, OF ALLENTON, WISCONSIN

SINK CATCH TRAP

Application filed January 16, 1929, Serial No. 332,994, and in Canada January 29, 1929.

The invention relates to catch traps for sinks and the like.

An object of the invention is to provide a catch trap capable of interposition between the drain fitting of a sink and a waste pipe therebelow and including a conveniently removable strainer receptacle for collecting solid waste matter passing from the sink, whereby to prevent such waste matter from clogging the waste pipe.

Another object of the invention is to provide a catch trap of such construction that it is readily capable of replacing the usual tailpiece of a sink, so that the device may be expeditiously installed on an existing sink.

The invention further consists in the several features hereinafter set forth and more particularly defined by the annexed claims.

In the accompanying drawings, Fig. 1 is an elevation of a catch trap embodying the invention, as it appears when installed on a sink, parts being broken away and parts being shown in section;

Fig. 2 is a sectional plan view taken on the line 2—2 of Fig. 1, and

Fig. 3 is a sectional plan view taken on the line 3—3 of Fig. 1, the cover for the trap compartment being removed.

In these drawings, the numeral 10 designates the bottom wall of a sink which is provided with the usual screened drain fitting 11. In a sink of conventional construction, the drain fitting 11 is connected with the usual waste trap 12 therebelow by means of the customary tailpiece 13, shown by dotted lines in the drawings.

In carrying out the invention, the tailpiece 13 is removed and the catch trap embodying the invention is installed in its place. The catch trap consists of a cup-like housing 14 having a tubular extension 15 depending therefrom and another tubular extension 16 extending upwardly therefrom and having its lower portions laterally entering the upper portions of the housing. The upper end of the extension 16 is secured to the drain fitting 11 at the bottom of the sink in any suitable manner, as by means of a union connection or a slip joint connection. The depending tubular extension 15 is inserted into the upwardly opening end portion of the waste trap 12 and forms therewith a slip joint connection. The axis of the depending tubular extension 15 is indicated in the drawing to be offset from the axis of the upper tubular extension 16, although these extensions may, if desired, be placed in alignment. In the event that these extensions are offset, as shown, it is necessary to displace the trap to register with the depending extension 15 and this may be accomplished in various ways. In the case of a lead trap, it is only necessary to bend the trap to suit, while with other types of traps it is possible to swivel the trap to its proper position or to make use of any slip joints that may be present.

The housing 14 receives therein at its lower portions a removable strainer basket 17 formed either of wire screen or perforated sheet metal to provide sieve openings. The bottom of the strainer is preferably dished, as shown, and the bottom of the housing may be similarly dished to facilitate drainage of liquid into the depending tubular extension 15. The strainer basket 17 is disposed below the lower end of the tubular inlet 16 and is provided with a bail 18 to facilitate its removal from the housing and its replacement therein.

The upper part of the housing is provided with an annular ledge 19 carrying an upwardly projecting marginal flange 20. A cover 21 fits within the marginal flange 20 and has secured thereto a gasket 22 of rubber or other suitable material which bears on the ledge 19. The cover 21 is retained in position on the housing 14 by means of a clamping device 23 including a downwardly-pressing spring-urged arm 24 pivotally mounted on a bracket member 25 secured about the tubular extension 16. The clamping device 23, in normal position, holds the cover 21 firmly in place on the ledge 19 of the housing to form a water tight seal, but is capable of displacement laterally away from the cover to permit the removal of the cover. To facilitate this removal, the cover 21 is provided with a handle 26.

When the device is in use on a sink, particles of solid matter in the sink are carried through the drain fitting 11 by water flowing therethrough and these solid particles collect in the strainer basket 17, the water flowing past the basket into the waste trap 12 and the connected waste pipe. In this manner, clogging of the trap is avoided. The solid matter accumulating in the strainer basket 17 can be readily disposed of by opening the cover 21 and lifting out the strainer basket, which is then emptied and replaced in the housing 14. The removal of waste matter from the catch trap is accomplished without danger of sewer gases entering the room, because the waste trap 12 is disposed below the catch trap.

The invention provides a catch trap of simple and inexpensive construction having large water passages to permit quick draining of the sink. The device is capable of convenient installation on sinks of conventional construction and is well suited for its intended purpose.

What I claim as new and desire to secure by Letters Patent is:

1. In a sink catch trap, the combination of a housing having an upper inlet conduit adapted for attachment to the drain fitting of a sink and a lower discharge conduit adapted for attachment to a waste pipe, a strainer receptacle removably mounted in said housing for intercepting solid waste matter passing from said sink into said housing, a cover secured to said housing and displaceable to permit the removal of said strainer receptacle from said housing, and downwardly urged resilient means carried by said inlet conduit and normally retaining said cover in sealing engagement with said housing.

2. In a sink catch trap, the combination of a housing having an upper inlet conduit adapted for attachment to the drain fitting of a sink and a lower discharge conduit adapted for attachment to a waste pipe, a strainer receptacle removably mounted in said housing for intercepting solid waste matter passing from sink into said housing, a cover secured to said housing and displaceable to permit the removal of said strainer receptacle from said housing, and a pivotally mounted spring-urged arm carried on said inlet conduit and normally retaining said cover in sealing engagement with said housing.

3. In a sink catch trap, the combination of a housing having an opening in its upper end, a vertically extending inlet conduit having its upper end adapted for attachment to the drain fitting of a sink, and having its lower end connected to the upper portions of said housing laterally of said opening, a vertically depending discharge conduit connected to the lower portions of said housing and adapted for connection with a waste trap, a strainer receptacle removably mounted in said housing for intercepting solid waste matter passing from said sink into said housing, a cover closing the opening of said housing and being displaceable to permit the removal and replacement of said strainer receptacle, and downwardly urged resilient means carried by said inlet conduit and normally retaining said cover in sealing engagement with said housing.

In testimony whereof, I affix my signature.

SIMON WEISS.